United States Patent [19]

Sugihara et al.

[11] Patent Number: 5,023,101
[45] Date of Patent: Jun. 11, 1991

[54] SHORTENING FOR HARD BUTTER PRODUCT AND PROCESS FOR PRODUCING HARD BUTTER PRODUCT

[75] Inventors: Hirosi Sugihara, Sennan; Hiroshi Hidaka, Sakai; Akira Doi, Sennan; Toshitaka Okawauchi, Sakai; Yasushi Kawabata; Hideki Baba, both of Sennan, all of Japan

[73] Assignee: Fuji Oil Company, Limited, Osaka, Japan

[21] Appl. No.: 284,121

[22] Filed: Dec. 14, 1988

[30] Foreign Application Priority Data

Dec. 14, 1987 [JP] Japan .................................. 62-316731
May 11, 1988 [JP] Japan .................................. 63-115053

[51] Int. Cl.$^5$ ............................................ A23C 15/12
[52] U.S. Cl. ..................................... 426/603; 426/607
[58] Field of Search ........................ 426/607, 631, 603

[56] References Cited

U.S. PATENT DOCUMENTS

| | | | |
|---|---|---|---|
| 3,006,770 | 10/1961 | Wiedermann | 426/603 |
| 3,102,814 | 9/1963 | Thompson | 426/607 |
| 3,132,952 | 5/1964 | Thompson | 426/607 |
| 3,270,040 | 8/1966 | Bradshaw | 426/607 |
| 3,425,842 | 2/1969 | Japikse | 426/603 |
| 3,492,130 | 1/1970 | Harwood | 426/607 |
| 3,549,386 | 12/1970 | Menzies | 426/607 |
| 3,595,674 | 7/1971 | Shaffer | 426/607 |
| 3,658,555 | 4/1972 | Menz | 426/603 |
| 3,706,578 | 12/1972 | Bence | 426/607 |
| 3,892,880 | 7/1975 | Grolitsch | 426/607 |
| 4,268,527 | 5/1981 | Matsuo | 426/607 |
| 4,276,322 | 6/1981 | Padley | 426/607 |
| 4,348,423 | 9/1982 | Pairaud | 426/607 |
| 4,439,461 | 3/1984 | Czyzewski | 426/603 |
| 4,590,087 | 5/1986 | Pronk | 426/603 |
| 4,844,928 | 7/1989 | van Heteren | 426/603 |
| 4,910,037 | 3/1990 | Sagi | 426/607 |

FOREIGN PATENT DOCUMENTS

| | | |
|---|---|---|
| 0023062 | 9/1980 | European Pat. Off. ............ 426/631 |
| 0196780 | 2/1986 | European Pat. Off. . |
| 0237307 | 9/1987 | European Pat. Off. . |
| 0276548 | 3/1988 | European Pat. Off. . |
| 2334747 | 8/1976 | France . |

OTHER PUBLICATIONS

Manning, 1985 Food Microstructure (4) 249-265.
Greenwell, 1981 Chilling and Crystallization of Shortenings and Margarines, JAOCS, Mar. 1981, pp. 206-207.
Severn, 1964 Bailey's Industrial Oil and Fat Products, third edition, Interscience Publishers, John Wiley & Sons, p. 13.
Wille et al., 1986 JAOCS 43:491-496.
Adenier, 1976 Fat Bloom II, Chocolaterie Confiserie de France, No. 322: 18-22.
Bloor, 1943 Biochemistry of Fatty Acids, Reinhold Publishing Corp., N.Y., p. 22.

*Primary Examiner*—Carolyn Paden
*Attorney, Agent, or Firm*—Wenderoth, Lind & Ponack

[57] ABSTRACT

Shortening for a hard butter product which comprises crystallized fat composed of as a main ingredient 1,3-saturated-2-unsaturated triglyceride the total carbon atoms of the constituent fatty acid residues of which are not less than 50, and main crystals thereof being of their stable type. There is also disclosed aspect of the present invention is a process for producing a hard butter product which comprises adding the above shortening to a molten mixture of hard butter ingredients during cooling and solidifying of the mixture without melting crystals of the shortening.

3 Claims, No Drawings

SHORTENING FOR HARD BUTTER PRODUCT AND PROCESS FOR PRODUCING HARD BUTTER PRODUCT

FIELD OF THE INVENTION

The present invention relates to shortening for hard butter products and a process for producing hard butter products. Particularly, it relates to shortening which is easily handled and useful to eliminate or simplify tempering of a hard butter product. The process of the present invention provides a hard butter product having excellent qualities by using the shortening of the present invention with no or a simplified tempering operation.

BACKGROUND OF THE INVENTION

In a process for producing a hard butter product such as chocolate, tempering is an important process to facilitate release of a solidified product from a mold and to obtain a product having good properties such as excellent luster, gloss, mouthfeel or the like.

However, in general, tempering operation of chocolate is troublesome and there is a tendency to omit tempering operation. For this purpose, it has been used a hard butter having a high elaidin content, or a hard butter wherein the fatty acid arrangement is randomized by interesterification or the like. However, miscibility of these hard butters with cacao butter is limited and, thereby, taste and flavor of the resulting product are also limited.

Further, regarding a method for tempering, there are optimum conditions for each production depending upon a particular kind of a hard butter used, composition and oil content as well as the presence of milk solids, but it is not always easy to find out the suitable conditions.

Thus, there have been employed various methods for tempering. However, in general, tempering usually involves at least one step for force-cooling a molten oily composition and at least one step for reheating it (for example, "Seika Jiten", page 459, October, 1981 published by Asakura Shoten).

Such tempering of chocolate is aimed at formation and increase in $\beta$-crystals. In contrast to this, $\beta'$-crystals is generally preferred as those of shortening (for example, "Yushi Yogo Jiten", edited by Nihon Yukagaku Kyokai, published in October 1987), and the content of $\beta$-crystals generally is low. Although liquid shortening wherein $\beta$-crystals predominantly exist is also known (U.S. Pat No. 3,360,376), its hard stock generally contains tri-saturated triglycerides as a main ingredient. Therefore, it is used for baking or the like and has no relation with chocolate production.

In the case of other hard butter products which contain a considerable amount of a fat or oil ingredient having a low melting point in addition to hard butter, it is difficult to effect tempering, which results in lowering of gloss and blooming of a hard butter ingredient during storage.

The present inventors have developed shortening which is suitable for a hard butter product such as chocolate. This is unexpected from the viewpoint of conventional usages of shortening. It has been found that, by using this shortening, tempering operation in the production of a hard butter product can be eliminated or simplified or can be carried out by a standardized step. In addition, it has been also found that this shortening is a cheap source of crystals which can become cores for growth of stable crystals in a hard butter product and has good dispersibility.

OBJECTS OF THE INVENTION

One object of the present invention is to provide shortening suitable for producing a hard butter product such as chocolate.

Another object of the present invention is to provide a process for producing a hard butter product by using the shortening of the present invention.

These objects as well as other objects and advantages of the present invention will become apparent to those skilled in the art from the following description.

SUMMARY OF THE INVENTION

In one aspect of the present invention, there is provided shortening for a hard butter product which comprises a crystallized fat composed of as a main ingredient 1.3-saturated-2-unsaturated triglyceride (hereinafter referred to as SUS type triglyceride) the total carbon atoms of the constituent fatty acid residues of which are not less that 50, and main crystals thereof being of their stable type. Another aspect of the present invention is a process for producing a hard butter product which comprises adding the above shortening to a molten mixture of hard butter ingredients during cooling and solidifying of the mixture without melting crystals of the shortening.

DETAILED DESCRIPTION OF THE INVENTION

The term "hard butter" is used herein includes cacao butter, cacao butter equivalents and cacao butter substitutes. The term "hard butter product" used herein includes oily confectionery comprising as main ingredients fats and oils, milk solids and sugars without of with a small amount of water (generally, less than 5% by weight in the product), for example, chocolates and confectionery containing a considerable amount of a fat or oil ingredient having a low melting point in addition to a hard butter such as creams for filling, centers and the like.

Shortening

The shortening of the present invention necessarily contains a crystallized fat the main ingredient of which is SUS type triglyceride. The total carbon atoms of the constituent fatty acid residues of the triglyceride should be not less than 50.

When the total carbon atoms are less than 50, the melting point of the triglyceride becomes too low, even if it is in stable crystals. Therefore, it becomes difficult to add the shortening to a mixture of hard butter ingredients such as a chocolate mix without melting the crystallized fat, and the effect of elimination or simplification of tempering operation of chocolate is hardly obtained. When the number of the total carbon atoms becomes larger, the melting point of the triglyceride becomes higher. Therefore, the crystallized fat becomes hard to melt even by contacting with a molten chocolate mix, which is generally advantageous from the viewpoints of the amount of the shortening to be used or the broader range of the operable temperature.

If the triglyceride of the main ingredient is not SUS-type but is, for example, that readily obtained from a completely hydrogenated hardened oil wherein 2-position is also saturated, that is, a tri-saturated triglyceride, good crystal growth can not be accelerated, which results in, for example, difficulty in release of a chocolate mix from a mold after cooling and, even if released, inferior gloss. Further, in the case of an isomer glyceride, i.e., 1,2- or 2,3-saturated-3- or 1-unsaturated glyceride, good crystal growth can not be accelerated, either.

In general, when the content of the triglyceride in the crystallized fat of the shortening is higher, a better result is expected. The content is, preferably, not less than 50% by weight and, more preferably, not less than 70% by weight. In SUS-type triglyceride in the crystallized fat, when the purity of the main molecule is higher, a better result of accelerating good tempering or eliminating the operation can be expected. That is, when the amount of one kind of triglyceride of SUS-type triglycerides in the crystallized fat becomes 50% or more, a preferred result can be obtained. For example, rather than cacao butter, the glycerides composed of solely 2-oleopalmitostearin can provide the similar favorable result to that obtained by using a triglyceride having a longer carbon chain.

In the shortening, the content of SUS-type triglyceride the total carbon atoms of constituent fatty acid residues of which are not less than 50 is preferably, not less than 5% by weight, more preferably, 10 to 90% by weight. When it is less than 5% by weight, the effect of eliminating or simplifying tempering is inferior and, when it is more than 90% by weight, the product is hardly plasticized.

Further, the main crystals of the crystallized fat should be of their stable-type. Otherwise, the effect of accelerating tempering becomes inferior and the product cast in a mold can not be released from the mold unless the conventional tempering is conducted. Even when used for enrobing, fat bloom is immediately caused. The term "stable type crystals" used herein means a crystal form showing at least 4 peaks of a short lattice spacing (side lattice spacing) in a X-ray diffraction spectrum of a single crystal form of one triglyceride. Preferably, the crystal form is IV form or more stable form, more preferably, V form or more stable form of cacao butter crystal forms designated by R. L. Wille and E. S. Lutton [J.A.O.C.S., 43, 491–496 (1986)]. If the crystallized fat contains a large amount of non-crystal fat or the crystal type thereof is not uniform, the weak peaks of short lattice spacing of the X-ray diffraction spectrum is not always clear and, therefore, it can be recognized by determining whether or not the prominent peaks of the short lattice spacing of the diffraction spectrum is corresponding to those of the stable-type crystals. For example, the most stable crystals of the triglyceride wherein the total carbon atoms of the constituent fatty acid residues are about 54 show a peak at about 4.6 Å. Shortening containing such a glyceride showing a prominent peak at around 4.6 Å is considered to be that mainly containing the stable type crystals.

The shortening of the present invention is that containing the above crystallized fat and may also contain amorphous glycerides.

The presence of amorphous glyceride can contribute to show plasticized or fluidized properties at a temperature of ambient temperature to about 30° C., while the fat is solid when it contains solely crystallized fat. Such plasticized or fluidized properties can improve dispersibility of the shortening when it is added to a hard butter mix. By this excellent dispersibility, superior effect can be expected with a relatively small amount of the crystallized fat. The amorphous glyceride facilitates crystal conversion of the SUS-type crystallized fat into the crystals of the stable type, particularly, the most stable type because it perhaps imparts a degree of freedom to the molecular behavior of an ingredient having a high melting point upon crystallization with cooling during the production of the shortening.

In addition to the crystallized fat and amorphous fat, the shortening of the present invention can contain various kinds of known additives for shortening, for example, emulsifiers such as glycerol fatty acid ester, lecithin, sorbitan fatty acid ester, propylene glycol fatty acid ester, polyglycerol fatty acid ester and polyglycerol condensed ricinoleic acid ester; antioxidants such as ascorbic acid, tocopherol and citric acid; and the like. However, the required amount is not so much as that required in conventional shortening. Further, the shortening of the present invention can contain other known raw materials of a desired hard butter product. For example, in the case of the shortening for chocolate, it can contain sugars, powdered milk, cacao mass, cocoa powder, emulsifiers and the like.

Process for producing shortening

The process for producing shortening of the present invention is not be limited to a specific process. In a typical example, the shortening can be produced by mixing and kneading a molten oily mixture of a fat or oil containing as the main ingredient SUS-type triglyceride the total carbon atoms of the constituent fatty acid residues of which are not less than 50, and a fat or oil being rich in a low-melting point ingredient with cooling.

The fat or oil containing as the main ingredient SUS-type triglyceride the total carbon atoms of the constituent fatty acid residue of which are not less than 50, preferably, less than 56 may be, for example, so-called vegetable butter such as cacao butter, mowrah butter, illipe butter, shea fat, sal fat, allanblackia fat, mango fat, kokum fat or the like, or palm oil, or a fractionated and purified product thereof. Further, it may be that obtained by selectively introducing a saturated fatty acid to 1- and 3-positions of a fat or oil being rich in triglyceride wherein the constituent fatty acid at 2-position is an unsaturated fatty acid (mainly oleic acid, but a small amount of linoleic acid, arachidonic acid, erucic acid or the like may be contained) (such techniques are described, for example, in Japanese Patent Kokai Nos. 52-104506, 55-71797 and 56-127094) and, if necessary, highly purifying by fractionation, or that prepared by other known processes for chemically synthesizing SUS-type triglyceride. In the case of a fat of oil containing a large amount of SUS-type triglyceride wherein total number of carbon atoms in the constituent fatty acid residue exceeds 56, generally, it is difficult to obtain it by fractionation and high purification of a natural fat or oil. Accordingly, it is preferred to use a fatty acid containing 20 to 24 carbon atoms is obtained by hardening, decomposition and purification of , for example, rapeseed oil, radish oil, lunaria oil, fish oil or whale oil, and the resulting free fatty acid or an ester with a lower alcohol is selectively introduced into 1- and 3-positions of the above fat or oil being rich in a triglyceride having 2-unsaturated fatty acid. If necessary, the resultant is highly purified by fractionation.

As the fat or oil being rich in a low-melting point ingredient, there can be mainly used that containing as the main ingredient a glyceride to which 2 or more unsaturated fatty acid residues are bonded, for example, soybean oil, rapeseed oil, cottenseed oil, corn oil, olive oil, peanut oil, safflower oil, sesame oil, a fractionated liquid oil of palm, lard, tallow or the like, or their hardened oils. In order to improve oxidation stability, the fat or oil is preferably a hardened oil with a low multi-unsaturated acid (such as linoleic acid or linoleic acid) content. Such a hardened oil can contain a certain amount of a high-melting point ingredient (the crystallized fat obtained during the production of the shortening) so far as it is rich in a low-melting point ingredient. In this case, its melting point ("melting point" herein used is determined at softening point unless otherwise stated) preferably does not exceed about 40° C. Further, the melting point preferably lower than 25° C. to sufficiently guarantee plasticity of the shortening.

The compounding ratio of the fat or oil mainly composed of SUS-type triglyceride the total carbon atoms of the constituent fatty acid residues are not less than 50 to that being rich in the low-melting point components is approximately 10 to 90:90 to 10.

The oily mixture prepared by compounding these ingredients is once molten and cooled with mixing and kneading. Preferably, this cooling is rapidly conducted in such a manner that the temperature of the mixture drops to 15° to 25° C. or lower within 10 minutes to obtain finer stable-type crystals. For this purpose, there can be readily employed a known cooling and kneading apparatus conventionally used for the production of shortening, for example, Votator, Onrator, Kombinator, Diacooler (all of them are trade names) and the like.

Further, the mixing can be conducted with blowing air or nitrogen gas to improve dispersibility of a product.

The cooling process as described above is easy and simple in comparison with other crystallization process, for example, a process wherein micelle of triglycerides with a solvent is formed and separated out, because the former process does not require any solvent treatment apparatus. Further, the former process is required no particular treatment to remove solvent. In general, such process is cheaper in comparison with processes by spraying from a spray drier, or by pulverizing mass or coarse grains of a hardened fat or oil alone or in combination with a certain dispersion medium.

The cooling process can extremely readily reduce size of crystalline grains to less than 500 $\mu$. Further, it is advantageous because the process can readily make the crystals smaller than 40 $\mu$ or 20 $\mu$. This advantage together with plasticity or fluidity of shortening provide excellent dispersibility in a mixture of hard butter ingredients and save the required amount of the shortening to be used.

After cooling and kneading, the product can be aged for 30 minutes or more, if necessary. Alternatively, the product can be simply allowed to stand to further stabilize the crystallized fat.

Process for producing hard butter product

The shortening as described above is added to a molted mixture of hard butter ingredients such as chocolate mix during of cooling and solidification of the mixture without melting the stable type crystals in the shortening to produce a desired hard butter product.

The term "chocolates" used herein is not limited to those containing cacao butter in an amount prescribed by the laws or rules, but includes chocolates using tempering type hard butter other than cacao butter, trans-acid type hard butter which is non-tempering type hard butter or hard butter wherein fatty acids distribution is randomized by ester interchange or lauric type fats and oils. Particularly, according to the present invention, it is possible to produce chocolates by mixing tempering type hard butter and non-tempering type hard butter in a desired ratio, which has been impossible to produce.

Addition of shortening is conducted in the step of cooling and solidification of a molten mixture of hard butter ingredients. Therefore, it is conducted at a temperature lower than that for completely melting the mixture (usually much higher than 40 ° C.). Further, addition of shortening should be conducted so as to avoid melting of the stable type crystals in shortening by the heat of the mixture. Therefore, it is added at a temperature lower than that of the mixture at which the stable crystals is not completely molten within a short period of time. According to this manner, a reheating step or following repetition of cooling and reheating can be eliminated. Further, a product can be cast into a mold or enrobed immediately after dispersing the shortening in the mixture. Accordingly, when the temperature of the mixture in tempering step is higher, tempering step can be further simplified. In fact, the tempering step is scarcely required. However, when the temperature of addition of shortening is higher, the stable type crystals of shortening is liable to be molten. As the result, the amount of shortening to be added should be increased or dispersion should be rapidly conducted. Therefore, the addition temperature should be determined by taking into consideration of such conditions. In general, a higher temperature can be selected, when the constituent fatty acid residues of the triglyceride contain more carbons. Addition of shortening is possible in so far as the temperature of the mixture is too low to lose fluidity.

In the process for producing a hard butter product, the shortening of the present invention is preferably added in such an amount that the SUS-type triglyceride is 0.005 to 10% by weight based on the oily ingredient in the hard butter ingredients.

After the shortening is added and dispersed, it is deposited, cast or enrobed according to a conventional method. In this case, the temperature of a hopper, a piston, a cylinder of a depositor or a mold for tempering may not be so strictly controlled as in the conventional process.

The present invention will be illustrated in the following examples in detail. In the examples, all %'s are by weight unless otherwise stated.

EXAMPLE 1

Commercially available SUS-type hard butter ("Melano SS-400" sold by Fuji Oil Co., Ltd.) containing, as a whole, 80.6% of SUS-type triglyceride with constituent fatty acid residues of more than 52 carbons (e.g., 2-oleyldistearin: 63.2 %) and hardened rapeseed oil (m.p.: 22° C.) were compounded in the ratio of 30/70. After heat melting at 50° C. or higher, the mixture was cooled and mixed quickly in Kombinator (the temperature of the product at the outlet: 20° C., the time required for the product to reach to the outlet: 5 min.) with nitrogen gas blowing (13 ±1.5% by volume based on the final product) to produce shortening. The resulting shortening was allowed to stand at 27° C. for a day before use in the following process for production of chocolate.

The shortening was subjected to X-ray analysis immediately or after standing for one day. Both showed prominent peaks of short lattice spacing at about 4.6 Å.

The peak height of the latter shortening which was allowed to stand was higher than that of the former, that is, the latter was further stabilized.

By using 40% of cacao mass, 50% of powder sugar and 10% of cacao butter as well as 0.4% of lecithin based on the total of the above materials as raw materials, according to a conventional method, molten chocolate mix (52° C.) was produced, which was cooled with stirring in a water bath at 34° C. When the temperature of the product was dropped to 34° C., the above shortening (25° C.) was added to the mix (2% of the mix). Stirring was continued for 10 minutes and the mixture was cast in a mold, and after about 15 to 20 minutes at about 10° C., release from the mold was observed. As the result, chocolate the produced readily released from a mold and had good gloss.

According to the same manner, chocolate was produced except that shortening was not added. The resulting chocolate could not release from a mold after 20 minutes. When the chocolate was forced to release from the mold, it had inferior gloss and luster.

Further, according to the same manner, chocolate was produced except that commercially available shortening ("Pumpas De Luxe" sold by Fuji Oil Co., Ltd.) was used. In this case, the resulting chocolate could not release from a mold either and, after it was forced to release from the mold, it had inferior gloss.

EXAMPLE 2

By using allanblackia extracted oil as a raw material, a high melting point fraction was obtained (yield: 59.1%, iodine value: 29.9, containing 95.1% of SUS triglyceride having more than 52 carbons in the constituent fatty acid residues, e.g., 91.2% of 2-oleyldistearin).

According to the same manner as described in Example 1, shortening was produced except that the fraction was compounded with rapeseed oil in the ratio of 30:70, 50:50 or 70:30. When the compounding ratio of rapeseed oil was higher, the product became softer and was more readily handled. All the shortening showed prominent peaks of short lattice spacing at about 4.6 Å by X-ray analysis and the main ingredients of the crystallized fats were of the most stable type.

By using 7% of cacao mass, 25% of whole milk powder, 40% of powder sugar and 28% cacao butter as well as 0.5% of lecithin based on the total amount of these materials, molten chocolate mix was prepared according to a conventional method. The molten chocolate mix thus obtained at 50° C. was cooled with stirring in a water bath at 34° C. When the temperature of the product was dropped to 35° C. during cooling, 2 % (the compounding ratio: 70:30) of the above shortening (30° C.) was added to the batter and stirring was continued for 10 minutes. Subsequently, the product was cast in a mold and release from the mold was observed after about 15 to 20 minutes at about 10° C. each product easily released from the mold to provide chocolate with good gloss.

EXAMPLE 3

According to the same manner as described in Example 1, commercially available SUS-type hard butter (the above described "Melano SS-400") was compounded with hardened rapeseed oil or a mixture of rapeseed oil and palm oil (m.p.: 17° C., 22° C. or 36° C.) in the ratio of 50:50 or 20:80 and, after heat melting at 50° C. or higher, shortening was produced. All of the resulting shortening mainly composed of the most stable type crystallized fats.

By using the resulting shortening, chocolate was produced according to the same manner as described in Example 1. As the result, release from a mold and gloss were evaluated as "good" except that the shortening containing hard butter and unhardened oil at the ratio of 20:80 was evaluated as "acceptable".

Criteria for the evaluation of release from a mold and gloss:

Good: The product can release by patting once or twice, and has gloss.

Acceptable: The product can release by patting 3 to 4 times, but shows partially striped pattern on its surface.

Bad: The product can not release from a mold even it was patted.

EXAMPLE 4

According to the same manner as described in Example 1, shortening was produced except that cacao butter (containing 81.8 % of SUS-type fats having 52 or more carbons in the constituent fatty acid residues wherein the content of 2-oleopalmitylstearin, the main ingredient, was 40.1%) was mixed with the equal amount of hardened rapeseed oil (m.p.: 22° C.).

According to the same manner as described in Example 1, chocolate was produced except that the above shortening was added to the chocolate mix at 32° C. The product readily released from a mold and had good gloss. However, when the addition was conducted at 35° C., the resulting product showed bad release from the mold and had bad gloss. Further, it showed blooming.

EXAMPLE 5

According to the same manner as described in Example 1, shortening was produced by mixing palm mid fraction (iodine value: 34.2, containing 76.7% of SUS type triglyceride such as 62% of 2-oleyldipalmitin) with hydrogenated rapeseed oil (m.p.: 10° C.) (80:80).

The resulting shortening was added to a molten chocolate mix (produced from cocoa powder of 8%, powder sugar of 35%, whole milk powder of 10 %, skim milk powder of 12%, the above palm mid fraction of 35% and lecithin of 0.4%), when the mix was cooled to 30° C. (0.5%, 1.0% or 3.0% based on the mix) and the resultant was cast in a mold and cooled. Releasing from a mold and gloss of the product were evaluated as "acceptable", "good" and "good", respectively.

EXAMPLE 6

According to the same manner as described in Example 1, commercially available SUS-type hard butter (the above described "Melano SS-400") was compounded with hardened rapeseed oil (m.p.: 22° C.) in the ratio of 20:80 and shortening was produced.

By using 30% of cacao mass, 5% of cocoa, 7% of whole milk powder, 38% of powdered sugar and 20% of palm oil as well as 0.4% of lecithin based on the total amount of these materials as raw materials, chocolate mix was prepared according to a conventional method. Thus molten chocolate mix thus obtained at 50° C. was cooled with stirring in a water bath at 30° C. When the temperature of the product dropped to 30° C., the above shortening (25° C., 0.1% based on the mix) was added to the mix. After stirring was continued for 10 minutes, the product was cast in a mold (2.5 cm×7.5 cm×0.8 cm). After standing at about 10° C. for about 15 to 20 minutes, release from a mold was observed. As the result, chocolate could easily release from the mold and had good gloss. The chocolate was comfortably molted in the mouth with cool feeling. The chocolate was free from bloom after standing at 20° C. for 3 months.

Likewise, according to the same manner as described above, by using completely hydrogenated palm oil and completely hydrogenated palm kernel oil stearin (iodine value: 6.6) (ascending melting point: 34.2° C.) instead of palm oil, a favorable result was obtained.

EXAMPLE 7

According to the same manner as described in Example 1, commercially available SUS-type hard butter (the above described "Melano SS-400") was compounded with hardened rapeseed oil (m.p.: 17° C.) in the ratio of 50:50 and shortening was produced.

By using 40% of palm mid fraction (iodine value: 45), 25% of whole milk powder, 20% of lactose and 15 of powdered sugar as well as 0.4% of lecithin based on the total amount of these materials as raw materials, a cream mix for a center filling was prepared according to a conventional method. Thus molten cream mix thus obtained at 50° C. was cooled with stirring in a water bath at 25° C. When the temperature of the product dropped to 25° C., the above shortening (33° C., 1% based on the mix) was added to the mix. After stirring was continued for 10 minutes, the product was used as a center filling of chocolate and molded. After standing at room temperature (20 to 25° C.), the center filling was observed. As the result, the center filling obtained by using the above shortening had smooth texture and formed no graying due to coarse fat crystals even after 2 months.

To the contrary, a center filling obtained without using shortening showed graying due to coarse fat crystals and crumbly texture and mouth feel within 1 month, which deteriorated the quality of the product.

EXAMPLE 8

By using 4% of cacao mass, 8% of cocoa, 10.4% of cacao butter, 26.6% of commercially available non tempering type fat for chocolate having a low SFI ("Melano BST" sold by Fuji Oil Co., Ltd.), 18% of whole milk powder and 33% of powdered sugar as well as 0.4% of lecithin based on the total amount of these materials as raw materials, chocolate mix was prepared according to a conventional method. Thus molten chocolate mix thus obtained at 52° C. was cooled with stirring in a water bath. When the temperature of the product dropped to 30° C., the shortening obtained in Example 7 (33° C., 0.5% based on the mix) was added to the mix. After stirring was continued for 10 minutes, the product was cast in a mold. As a control, a product without the shortening was prepared according to the same manner.

These products were stored at a constant temperature of 15° to 25° C. or with raising and dropping the temperature between 17° C. and 30.5° C. four times per day, respectively and the surface and inside states of the products were observed. As the result, the product without the shortening showed graying and had bad gloss within 1 month, whereas the product with the shortening maintained original good gloss and showed no graying.

As described above, the shortening of the present invention can eliminate reheating step of tempering in the production of a hard butter. Further, even when the tempering is simplified or omitted, the product can readily release from a mold or it is rapidly dried and used for enrober in an early stage. Thus, the product having good properties such as gloss or mouthfeel can be readily obtained. By using the shortening of the present invention, the problem of limitation of compatibility with cacao butter can be solved. Therefore, cacao butter can be mixed, for example, with lauric type fats and oils in any desired ratio to easily provide a hard butter product which has comfortably melting in the mouth with cool feeling and good cacao butter flavor. Further, tempering operation can be standardized in comparison with a conventional method and preliminary examination for determining tempering style can be minimized, which is extremely advantageous from the practical viewpoint.

What is claimed is:

1. Plasticized or fluidized shortening for a hard butter product which comprises crystallized fat and amorphous glycerides in an amount sufficient to provide said shortening with plasticized or fluidized properties at 30+ C., said crystallized fat being composed of as a main ingredient 1,3-saturated-2-unsaturated triglyceride, the total carbon atoms of the constituent fatty acid residues of which are not less than 50, and whereas the main crystals thereof are in a stable form such that they are at least in the V form of the glyceride.

2. The shortening according to claim 1, wherein said 1,3-saturated triglyceride is contained in an amount of not less than 5% by weight based on said shortening.

3. A process for producing a hard butter product which comprises adding plasticized or fluidized shortening to a molten mixture of hard butter ingredients during cooling and solidifying of the mixture without melting crystals of the shortening, said shortening comprising crystallized fat and amorphous glycerides in an amount sufficient to provide said shortening with plasticized or fluidized properties at 30° C., said crystallized fat being composed of as a main ingredient 1,3-saturated-2-unsaturated triglyceride, the total carbon atoms of the constituent fatty acid residues of which is not less than 50, and whereas the main crystals thereof are in a stable form, such that they are at least in the V form of the glyceride.

* * * * *